US012748792B2

(12) United States Patent
Kharbanda et al.

(10) Patent No.: US 12,748,792 B2
(45) Date of Patent: Sep. 29, 2026

(54) CONTENT-BASED ANNOTATION DETECTION AND SUMMARIZATION FOR DOCUMENTS

(71) Applicant: OPEN TEXT INC., Menlo Park, CA (US)

(72) Inventors: Samiksha Kharbanda, Hyderabad (IN); Ranjit Boddu, Hyderabad (IN)

(73) Assignee: OPEN TEXT INC., Menlo Park, CA (US)

( * ) Notice: Subject to any disclaimer, the term of this patent is extended or adjusted under 35 U.S.C. 154(b) by 0 days.

(21) Appl. No.: 18/903,767

(22) Filed: Oct. 1, 2024

(65) Prior Publication Data

US 2026/0093742 A1 Apr. 2, 2026

(51) Int. Cl.
*G06F 16/93* (2019.01)
*G06F 16/334* (2025.01)
*G06F 16/34* (2019.01)

(52) U.S. Cl.
CPC ........ *G06F 16/3347* (2019.01); *G06F 16/345* (2019.01); *G06F 16/93* (2019.01)

(58) Field of Classification Search
CPC ..... G06F 16/93; G06F 16/345; G06F 16/3347
See application file for complete search history.

(56) References Cited

U.S. PATENT DOCUMENTS

| | | | | |
|---|---|---|---|---|
| 12,002,276 B2 * | 6/2024 | Kelly | .................... | G06F 16/355 |
| 12,210,839 B1 * | 1/2025 | Burton | .................... | G06F 40/30 |
| 12,450,274 B1 * | 10/2025 | Jain | .......................... | G06F 16/35 |
| 2024/0130621 A1 * | 4/2024 | Islam | ................... | A61B 5/0088 |
| 2024/0404304 A1 * | 12/2024 | Modem | .................. | G06V 20/70 |
| 2025/0211549 A1 * | 6/2025 | Arunachalam | ......... | H04L 51/02 |

FOREIGN PATENT DOCUMENTS

CN 118334685 A * 7/2024 ............... G06N 3/08

* cited by examiner

*Primary Examiner* — Tarek Chbouki
(74) *Attorney, Agent, or Firm* — Sprinkle IP Law Group

(57) ABSTRACT

Systems and methods for context-based annotation analyzation are provided. A system and method provides an artificial intelligence (AI) solution that aims to automate, accelerate, and enhance the accuracy of managing annotations and comments, thereby minimizing the risks associated with manual processing. The system and method leverages AI models to contextually identify and understand annotations within documents, allowing for precise summarization and enabling advanced search capabilities based on these annotations.

20 Claims, 6 Drawing Sheets

```
chunks = [
    {
      'text': "7th Pay allowance ...",
      'metadata': {
        'comments': [ {'author': 'HR1', 'comment': 'Remove 7th Pay for this employee'} ],
        'replies': [ {'author': 'HR2', 'reply': 'Removed'} ]
      },
      'coordinates': {
            'x0': 100, # Example coordinates
            'y0': 50,
            'top': 200,
            'bottom': 250,
            'page': 1
        }
    },
    {
      'text': "Allowance Table ...",
      'metadata': {
        'comments': [ {'author': 'HR1', 'comment': 'Fitness allowance to be added'}, ],
        'replies': [ {'author': 'HR2', 'reply': 'added'}, ]
      },
      'coordinates': {
            'x0': 150,
            'y0': 100,
            'top': 300,
            'bottom': 350,
            'page': 1
      }
    }
]
```

FIG. 6

CONTENT-BASED ANNOTATION DETECTION AND SUMMARIZATION FOR DOCUMENTS

TECHNICAL FIELD

This disclosure relates generally to annotations and associated comments made by users with respect to documents. In particular, this disclosure relates to systems and methods using artificial intelligence for context-based annotation detection and summarization.

BACKGROUND

Annotations and their corresponding comments serve as vital documentation within a record and should be carefully managed to maintain consistency and accuracy. When documents undergo concurrent or sequential reviews in an electronic system, the process becomes significantly more streamlined, ensuring that all notations are tracked and handled according to established business protocols. Failure to properly record and interpret these annotations can result in significant business risks.

For instance, consider a scenario where an auditor needs to review all annotations and comments across multiple documents to confirm that every issue has been addressed. Currently, this often involves sifting through thousands of files manually, an exhaustive task that not only consumes time but also increases the likelihood of human error, potentially compromising the integrity of the review process.

SUMMARY

Systems and methods for context-based annotation analyzation are described that, in some embodiments, include obtaining a plurality of documents having annotations, for each of the plurality of documents: extracting annotation data and corresponding coordinate data, the coordinate data associating respective annotation data with a coordinate in the respective document, creating a page chunk for the respective document, the page chunk combining the annotation data and the coordinate data for the respective document, and creating an embedding from the respective page chunk and storing the created embedding in a vector store, in response to a user query, providing relevant embeddings to a Large Language Model (LLM) trained to recognize patterns in annotations, and generating a response to the query using the output of the LLM.

Embodiments of the present invention also include computer-readable storage media containing sets of instructions to cause one or more processors to perform the methods, variations of the methods, and other operations described herein.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 6 shows an example of an embeddings chunk.

DETAILED DESCRIPTION

Figure 1:
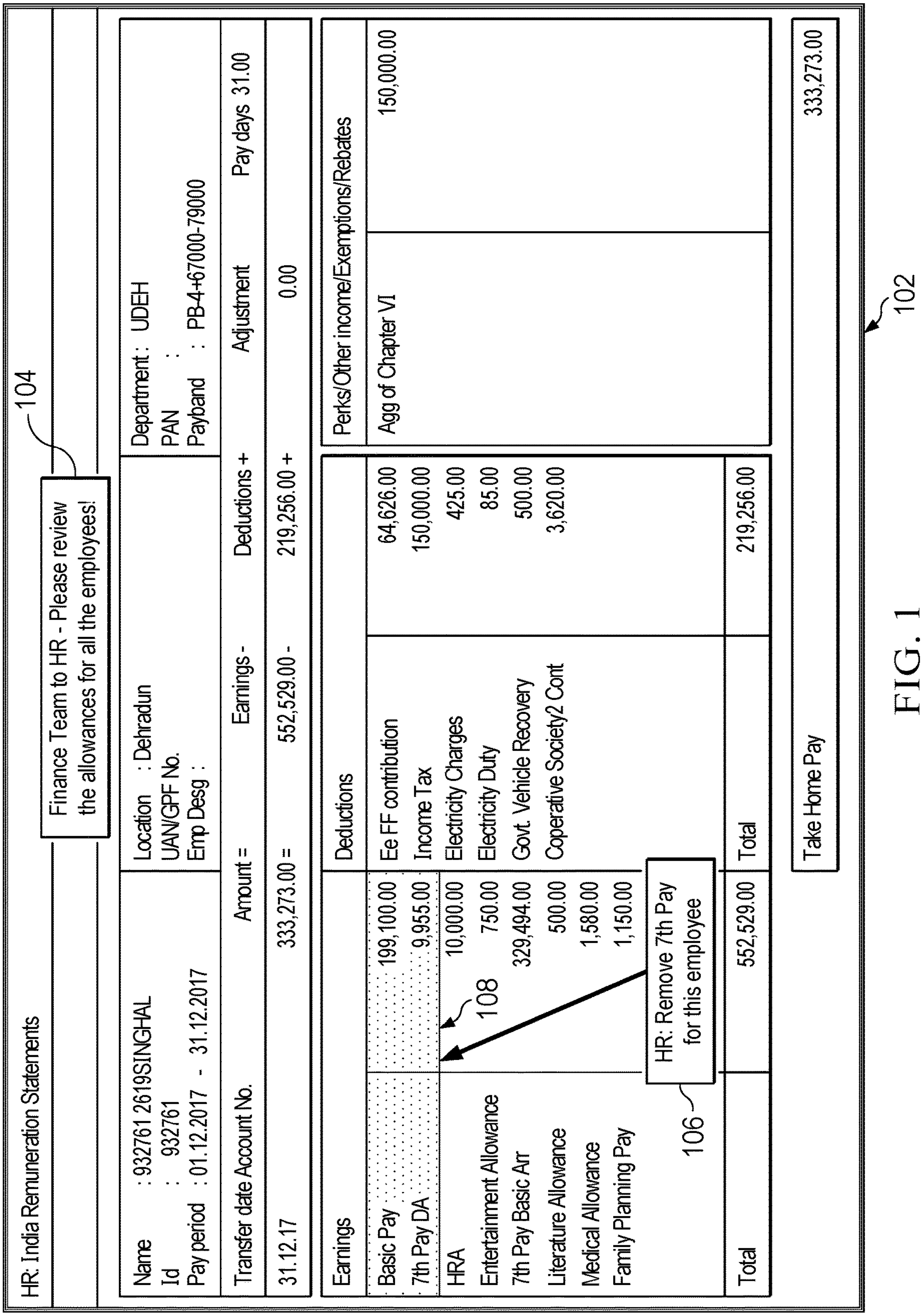
FIGS. 1 and 2 are diagrams illustrating one example of the use of an annotation detection and summarization system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

The present disclosure describes a system and method that provides an artificial intelligence (AI) solution that aims to automate, accelerate, and enhance the accuracy of managing annotations and comments, thereby minimizing the risks associated with manual processing. One concept involves leveraging AI models to contextually identify and understand annotations within documents, allowing for precise summarization and enabling advanced search capabilities based on these annotations. This solution functions seamlessly, for example, in an extended enterprise content management (ECM) business workspace or on standalone documents.

Generally, the problem addressed (as discussed above) is the time-consuming and error-prone process of reviewing and interpreting document annotations in a content management system. The proposed solution leverages AI, for example, Large Language Models (LLMs) like BERT and GPT, to analyze, interpret, and summarize annotations. This AI-based approach adds context to annotations, enhancing their grouping and coordination across multiple documents. By training LLMs to recognize patterns in annotations, the system can accurately classify and extract relevant information, automating the annotation review process. This solution aims to reduce manual errors and improve efficiency by contextualizing annotations within the broader document repository, enabling more accurate search and retrieval based on annotation data.

The disclosed innovative approach leverages a large language model (LLM) combined with a customized service solution to analyze the relationship between annotations and a document's content. This integration enables the AI to segregate and contextualize annotations across linked documents, producing accurate results for question and answer scenarios and summarization tasks. In some examples, the same text can be highlighted in various documents, but the algorithm will not only detect the annotation and highlighted content, but will also be able to add the context to the annotation, enhancing the accuracy. Additionally, the solution is designed to support various document viewers, including, but not limited to, for example, Intelligent Viewing, Brava!, Imaging Viewers, Hightail, Adobe, Microsoft Word, etc., facilitating annotation detection and summarization through LLM integration, regardless of the platform used.

The disclosed approach may be better understood in the context of some exemplary use cases. Assume that Kate, a financial analyst, is conducting an organizational audit and needs the employee allowances reviewed by Jane, a human resources (HR) specialist. To streamline the process, Kate adds annotations across several documents, directing Jane to review the allowances as part of the workflow. Jane then meticulously examines each document, adding her feedback using annotations and comments. After the review, Kate needs to consolidate and understand all of Jane's inputs, but manually navigating through numerous files would be time-consuming. To expedite this task, Kate leverages the disclosed annotation detection and summarization AI solution. By simply requesting a summary of all HR comments, the AI quickly compiles and presents a comprehensive overview, saving Kate countless hours of manual review and ensuring that no critical feedback is missed.

With respect to another types of use case, it is noted that annotations are frequently employed in engineering scenarios to facilitate collaboration between engineers and supervisors, especially during design review processes. Throughout multiple iterations of engineering drawings, supervisors provide feedback through comments and annotations, guiding engineers on how to enhance their designs. The disclosed solution applies sentiment analysis to annotations, helping supervisors gain deeper insights into the feedback provided. For example, the AI system can be used to identify engineers who have received repeated suggestions for improvement, highlighting areas where additional support or training may be needed. Additionally, the AI can quantify the sentiment of feedback, such as by detecting and categorizing annotations with negative sentiment. Using advanced embeddings and content chunking, the solution can generate a detailed report showing which engineers have received the most critical feedback, making it easier for supervisors to track design quality and address persistent issues efficiently.

Generally, the novel approach of content-based annotation detection and summarization for documents centers around extracting detailed metadata from annotations, including their coordinates and relevant contextual text within the document. By combining the spatial coordinates of the annotations with their comments and the surrounding text, the system creates rich"text chunks," which are then used to generate embeddings for integration with Large Language Models (LLMs). This innovative method allows the AI to provide highly accurate summaries and contextual conversations specifically tailored to the annotations within the documents.

Note that the term "coordinates," as uses herein, can apply to various contexts. For example, when talking about coordinates in the context of images or a text-based document, it has different meanings based on the type of medium and its layout. In an image (e.g., in a PDF document, etc.), coordinates may refer to a specific location in a two-dimensional space. This is typically represented by an (x, y) pair, where x is the horizontal position (left to right) and y is the vertical position (top to bottom). These coordinates are used to pinpoint a location, help place objects, define shapes or areas, etc. In a text document, coordinates aren't about pixels, but rather about character positions or line placements. This could include page and line numbers to identify where a word(s) or character(s) is located, character offsets that count each character from the start of the document, etc. Text document coordinates may also be used to locate, navigate, edit, or format text elements rather than position them visually. While "coordinates" may relate to image coordinates that are spatial and focus on visual layout, in text documents, coordinates are more structural, dealing with characters and lines within a linear document.

One complexity of this solution lies in accurately identifying the precise locations of annotations and extracting their associated metadata and text. Depending on the annotation format, this process may require specialized metadata extraction and annotation detection libraries to seamlessly integrate and link the spatial and textual data, as one skilled in the art would understand. This enables the disclosed solution to analyze annotations in a way that is contextually aware, ensuring precise and meaningful responses when summarizing or querying the content of complex engineering or business documents.

Figure 2:
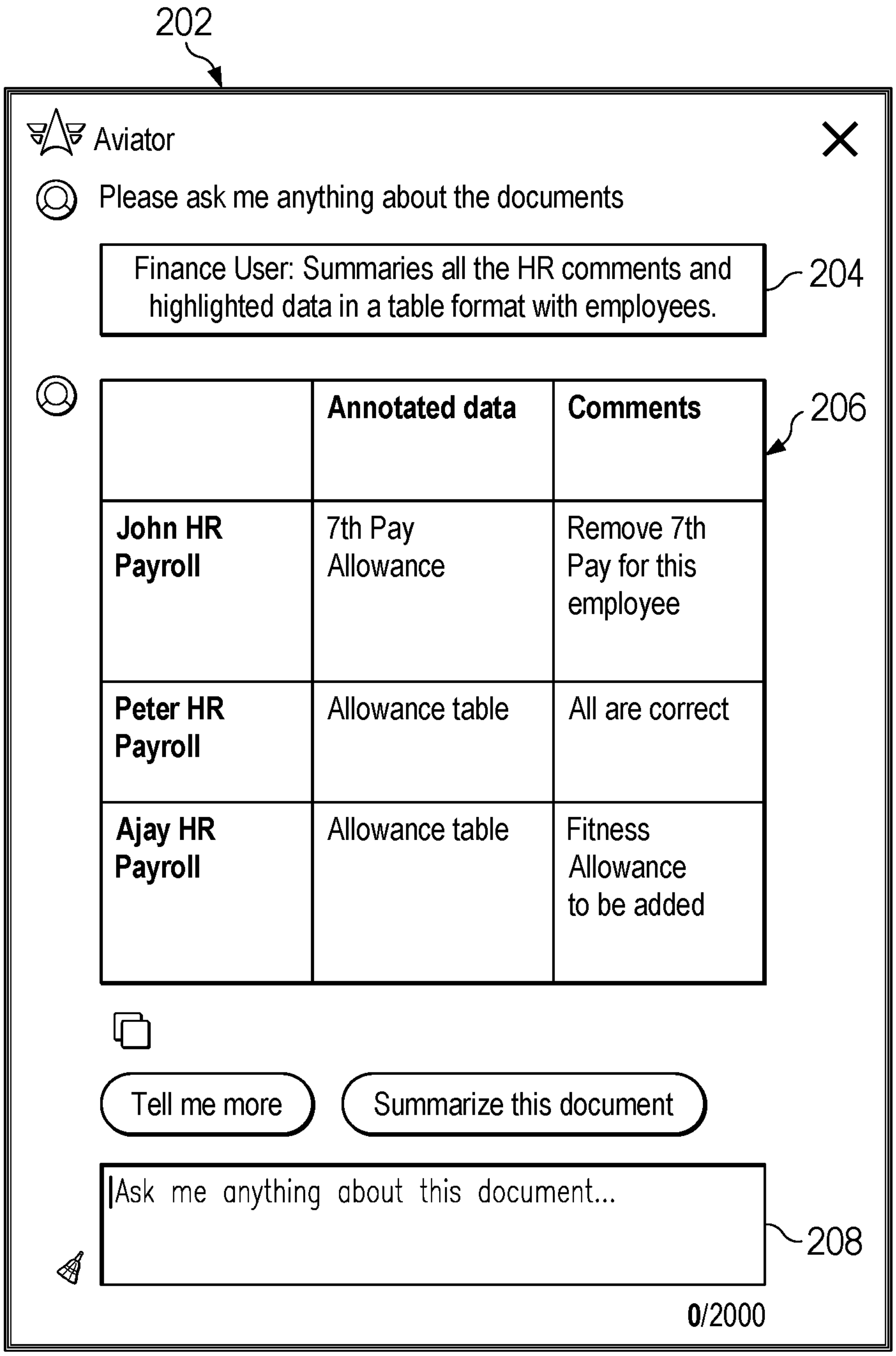

FIGS. 1 and 2 are diagrams illustrating one example of the use of an annotation detection and summarization system. FIG. 1 is a screenshot of a document 102. In this example, the document 102 may be a PDF or other image-based document of a remuneration statement used by an HR department of an organization. In this example, several annotations are shown. A first annotation 104 has been added to the top of the document 102 by a user (someone from a finance team) stating "Finance Team to HR—Please review the allowances for all the employees!" A second annotation 106 has been added by another user (someone from HR) stating "HR: Remove 7th Pay for this employee," which is shown as an overlay on the document 102. The annotation 106 identifies a specific area 108 (coordinates) of the document 102, specifically the lines of the remuneration statement "Basic Pay" and "7th Pay DA", including the values of each, as shown by the highlighting and the arrow pointing to the identified area.

FIG. 2 shows a user interface 202 of an AI chatbot, including a query field 204, where a user (e.g., the Finance User shown in FIG. 2) can submit a query to the chatbot, relating to the document 102, or group of documents. In this example, the user submits the query "Summarize all the HR comments and highlighted data in a table format with employees." The AI chatbot integrates with the LLM (discussed above) and provides the response 206, which in this example, is a table of users ($1^{st}$ column), annotation data (second column), and comments (third column). From the response 206, the finance user is able to easily see a summary of comments provided by HR in perhaps hundreds or thousands of renumeration statements, without having to manually sort through numerous documents and annotations. As shown, this service is able to find all of the metadata of who has added these annotations (for example, in the first line, John from HR Payroll) as well as what was highlighted ($7^{th}$ Pay Allowance), and also the comment added by John ("Remove $7^{th}$ Pay for this employee"). This is all possible, due to the LLM being provided the coordinates of each annotation, in addition to other metadata, such as the annotation creator and contents. The chatbot interface 202 also includes a follow-up query field 208, where the user can enter further queries or request clarification or other information about the previous query. The chatbot interface 202, in this example, also shows buttons where the user can easily submit requests such as "Tell me more" and "Summarize the document."

Figure 3:
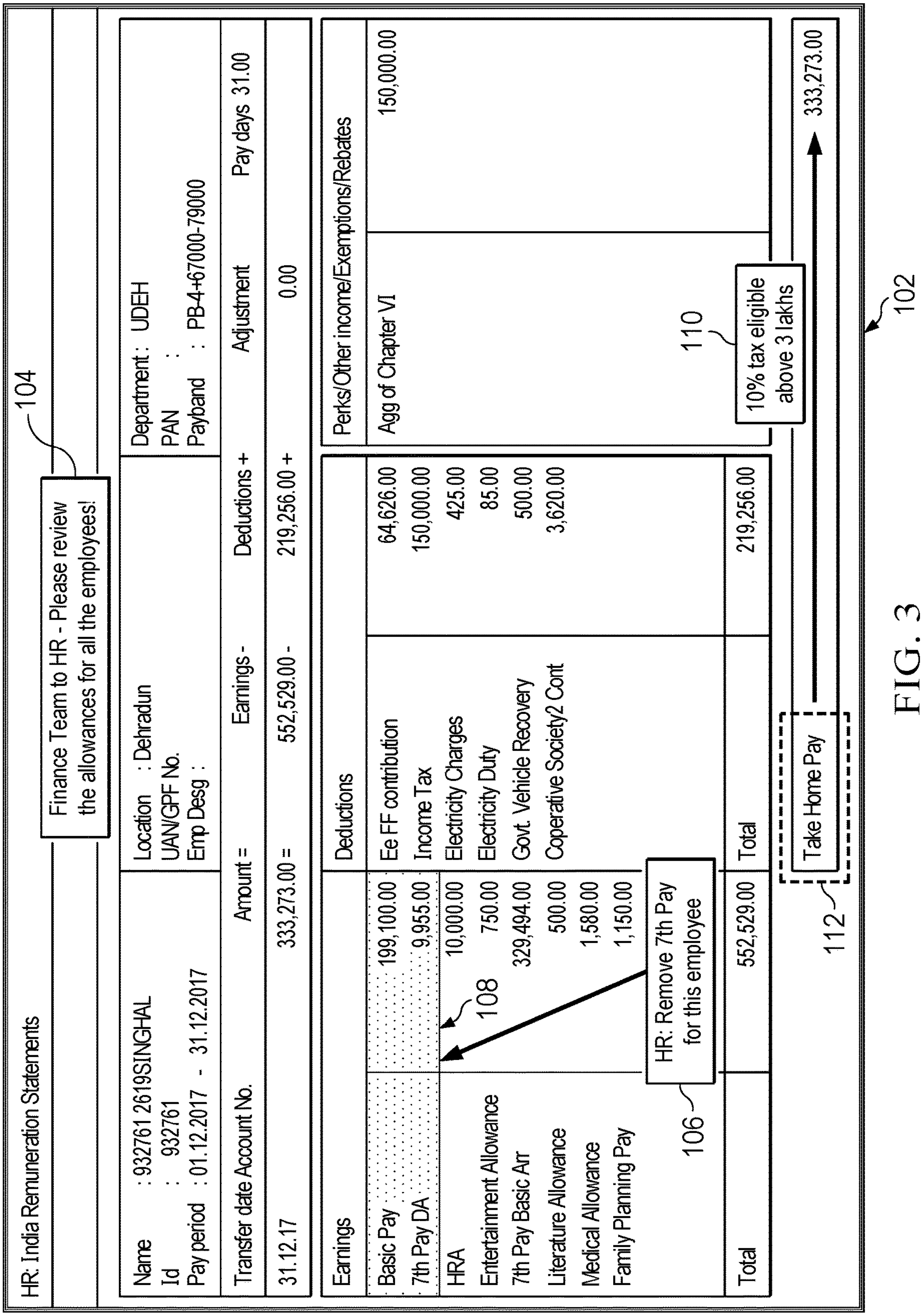
FIGS. 3 and 4 are diagrams illustrating another example of the use of an annotation detection and summarization system.

FIGS. 3 and 2 are diagrams illustrating another example of the use of an annotation detection and summarization system. FIG. 3 is a screenshot of the document 102, as shown in FIG. 1. In this example, the document 102 shows a third annotation 110 that has been added by a user stating "10% tax eligible above 3 lakhs." The annotation 110 identifies a specific area 212 (coordinates) of the document 102, specifically the lines of the remuneration statement "Take Home Pay".

Figure 4:
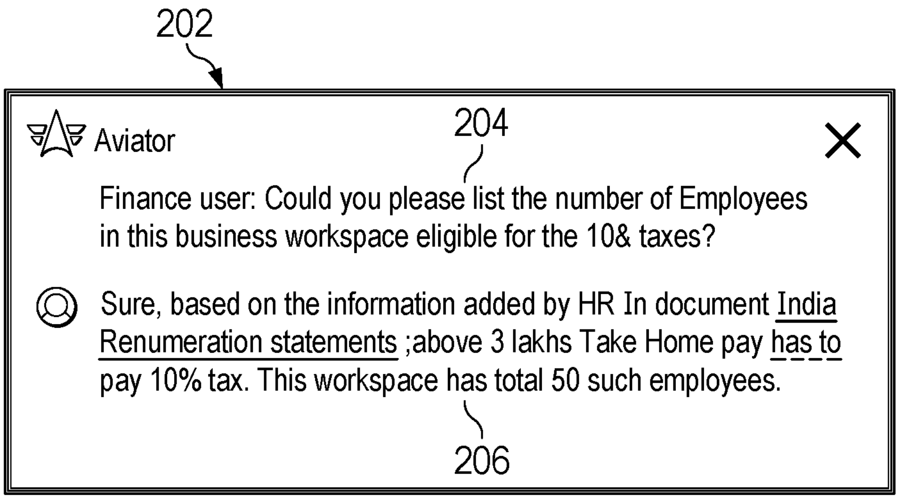

FIG. 4 shows the user interface 202 of the AI chatbot, including a query field 204, where a user (e.g., Finance User) can submit a query to the chatbot, relating to the document 102, or group of documents. In this example, the user submits the query "Could you please list the number of Employees in this business workspace eligible for the 10% taxes?" The AI chatbot provides the response 206, which in this example, is the reply "Sure, based on the information added by HR in document India Remuneration Statements, above 3 lakhs Take Home pay has to pay 10% tax. This workspace has a total of 50 such employees." As can be seen, the Finance user can obtain this information easily, without manually going through perhaps hundreds of remuneration statements, such as document 102 to determine this information. As before, this is possible, due to the LLM being provided the coordinates of each annotation, in addition to other metadata, such as the annotation creator and contents. In this example, the LLM is able to calculate the number of employees eligible based on the annotations that the LLM analyzed.

Figure 5:
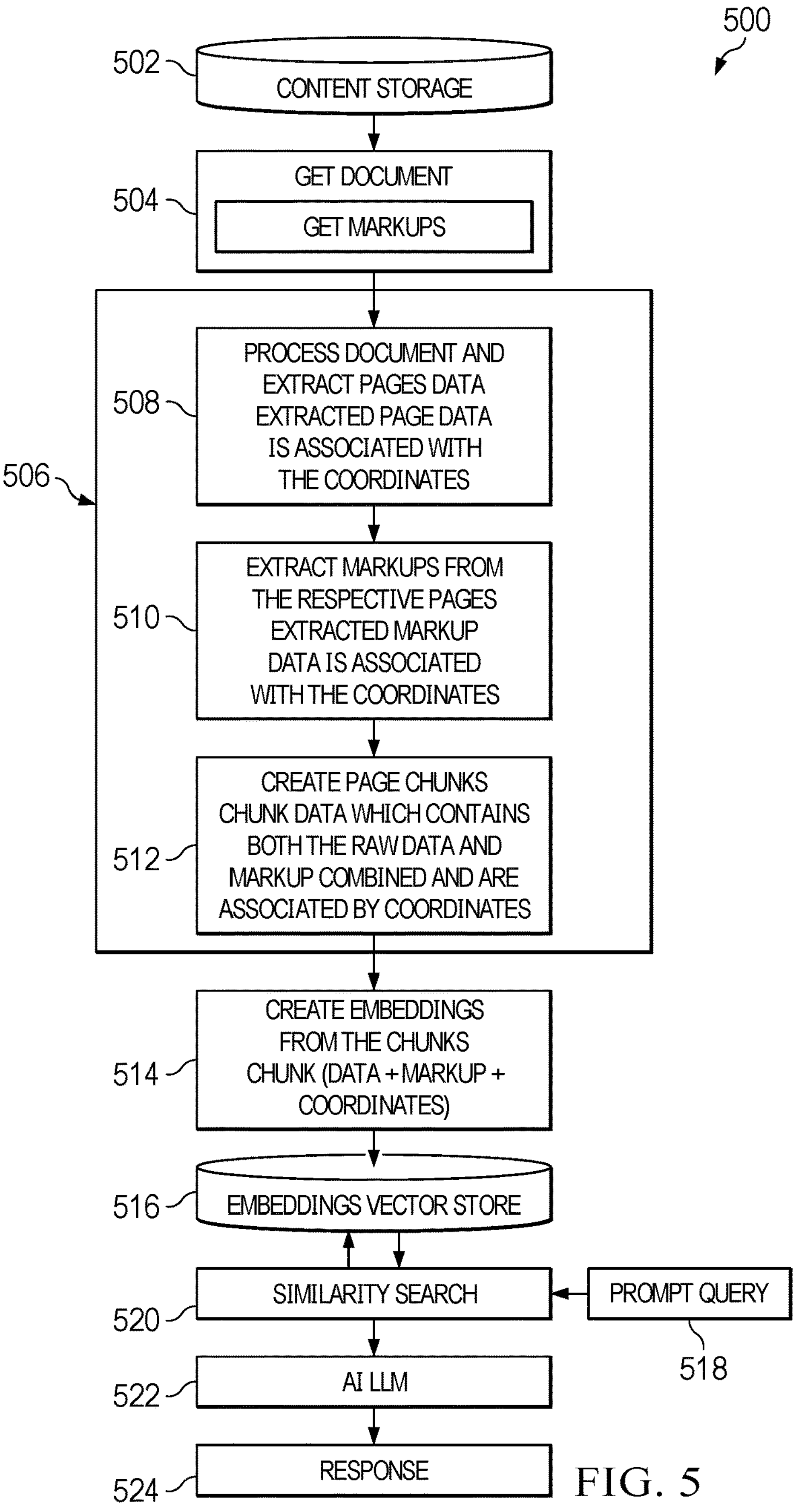
FIG. 5 is a diagram showing one example of a process for context-based annotation detection and summarization.

FIG. 5 is a diagram showing one example of a process 500 for context-based annotation detection and summarization. In this example, documents and markups/annotations are stored in content storage 502. At block 504, the system gets a document (e.g., such as document 102 described above), including markups/annotations. Next, the document is processed at block 506, which includes three sub-blocks.

At block 508, the system processes the document and extracts page data. As discussed above, page data (e.g., annotations) is associated with coordinates of the documents. If a document has markups, the pages with markups are extracted, along with page coordinates. At block 510, markup data is extracted from the respective pages, and the extracted markup data is associated with the coordinates. The markup data generally includes the page number, the text, metadata, and the coordinates. At block 512, page chunks are created. Page chunk data contains both the text data, the markup data combined and are associated by the coordinates.

At block 514, embeddings are created from the chunks. As discussed above, the chunks each include raw data, markups, and associated coordinates. The embeddings are stored in vector store 516, where they are accessible by the LLM. FIG. 6 shows one example of an embeddings chunk. As shown, the chunk includes text, metadata, including comments and replies, and coordinates of the annotations. The embeddings stored in the vector store creates a knowledge base that is used in part of the LLM system. Note that in the context of LLMs, "embedding" refers to representing text (e.g., words, phrases, or comments) as numerical vectors that capture their meaning and context. Since these novel embeddings include context of the markups (via the markups and their respective coordinates), this allows the LLM to understand relationships between the documents and annotations, group similar ones, and improve search and summarization by comparing these vectorized representations.

As discussed above with respect to FIGS. 2 and 4, the system provides a user interface, enabling a user to submit queries to the LLM relating to documents and annotations. At block 518, a user can submit a prompt query to the LLM via a user interface. At block 520, a similarity search is performed on the embeddings stored in the embeddings vector store 516. Note that a similarity search, in the context of LLMs, involves finding pieces of text, sentences, or other data that are semantically similar to a given query. The idea is to compare the meaning or context of different text samples rather than just their surface-level words. In this example, this is done using the vector representations of text. In one example, the similarity search is performed by converting input text into a vector representation and comparing this vector representation to embeddings stored in the vector store. After computing similarity scores, vectors are ranked based on similarity to the input.

At block 522, the results of the similarity search are provided to the LLM. The LLM is trained to recognize patterns in annotations, etc., and can therefore generate a response at block 524 (such as the responses shown in FIGS. 2 and 4). This approach allows for more context-rich responses by incorporating not just the raw text, but also any associated annotations or comments. This can lead to more accurate and informative answers to user queries about the document.

Following is a workflow process that generally follows the diagram shown in FIG. 5. A first step in the workflow process is data/text extraction (e.g., 508). Text is extracted by page, e.g., a paragraph on page 1 at specific coordinates. Next is annotation/markup extraction (e.g., 510), where overlaying highlights or bounding boxes on the pages indicate where each text is located. Annotations/markups are extracted that are associated with the same page and coordinates. Next is data combination (e.g., 512), where annotations (comments, replies) are linked directly to their corresponding positions on the page and the extracted text and annotations are combined for the specific paragraph as chunk. Next is embedding creation (e.g., 514), where embeddings are created from the combined data (text+annotations) chunk. Next is storage (e.g., 516), where the embeddings are stored into a vector store database. Next is query processing (e.g., 518-522), where, when a query is made from the UI regarding the document, the vector store is searched for relevant embeddings, the matching extracted text and annotations are retrieved, and this information is provided to the AI LLM for processing. Finally, at response generation (e.g., 524), the LLM uses both the extracted text and annotations to generate a more detailed and relevant response.

Note that the prompt query and generated responses are not limited to the examples shown. The system described above is capable of provided responses to numerous types of queries. Besides asking the system to summarize annotations, a user can query the system for more general or more specific information. For example, a query could ask for user sentiment relating to a specific document, or a specific part of a document. The user sentiment can be determined by the LLM based on user annotations and comments. For example, in the example of a contract, the LLM could determine that a specific provision of the contract is viewed unfavorable, based on repeated negative markups related to that provision.

Although the invention has been described with respect to specific embodiments thereof, these embodiments are merely illustrative, and not restrictive of the invention as a whole. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A method of context-based annotation analyzation, the method comprising:

obtaining a plurality of documents having annotations;

for each of the plurality of documents:

extracting annotation data, text, and corresponding coordinate data, the coordinate data associating the annotation data and the text with at least one corresponding coordinate in the document, creating a page chunk for the document, the page chunk combining the annotation data and the text for the document and associating the annotation data and the text data based on the coordinate data, and creating an embedding from the annotation data and the text of the respective page chunk and storing the embedding in a vector store;

in response to a user query, providing the embedding to a Large Language Model (LLM) trained to recognize patterns in annotations; and generating a response to the user query using an output of the LLM.

2. The method of claim 1, wherein a first document of the plurality of documents is an image document, and wherein the coordinate data identifies a location on the first document.

3. The method of claim 2, wherein the coordinate data comprises x, y coordinates of the image document.

4. The method of claim 1, wherein a first document of the plurality of documents is a text document, and wherein the coordinate data identifies a location in the text document.

5. The method of claim 4, wherein a first document of the plurality of documents is a text document, and wherein the coordinate data identifies character positions in the text document.

6. The method of claim 1, wherein the embedding is provided to the LLM based on being determined by a similarity search.

7. The method of claim 6, wherein the similarity search determines similarities between the user query and a plurality of embeddings stored in the vector store.

8. A system for context-based annotation analyzation, the system comprising:

a processor; and a non-transitory computer readable medium storing instructions translatable by the processor, the instructions when translated by the processor perform:

obtaining a plurality of documents having annotations;

for each of the plurality of documents:

extracting annotation data, text, and corresponding coordinate data, the coordinate data associating the annotation data and the text with at least one corresponding coordinate in the document, creating a page chunk for the document, the page chunk combining the annotation data and the text for the document and associating the annotation data and the text data based on the coordinate data, and creating an embedding from the annotation data and the text of the respective page chunk and storing the embedding in a vector store;

in response to a user query, providing the embedding to a Large Language Model (LLM) trained to recognize patterns in annotations; and generating a response to the user query using an output of the LLM.

9. The system of claim 8, wherein a first document of the plurality of documents is an image document, and wherein the coordinate data identifies a location on the first document.

10. The system of claim 9, wherein the coordinate data comprises x, y coordinates of the image document.

11. The system of claim 8, wherein a first document of the plurality of documents is a text document, and wherein the coordinate data identifies a location in the text document.

12. The system of claim 11, wherein a first document of the plurality of documents is a text document, and wherein the coordinate data identifies character positions in the text document.

13. The system of claim 8, wherein the embedding is provided to the LLM based on being determined by a similarity search.

14. The system of claim 13, wherein the similarity search determines similarities between the user query and a plurality of embeddings stored in the vector store.

15. A computer program product comprising a non-transitory computer readable medium storing instructions translatable by a processor, the instructions when translated by the processor perform, in an enterprise computing network environment:

obtaining a plurality of documents having annotations;

for each of the plurality of documents:

extracting annotation data, text, and corresponding coordinate data, the coordinate data associating the annotation data and the text with at least one corresponding coordinate in the document, creating a page chunk for the document, the page chunk combining the annotation data and the text for the document and associating the annotation data and the text data based on the coordinate data, and creating an embedding from the annotation data and the text of the respective page chunk and storing the embedding in a vector store;

in response to a user query, providing the embedding to a Large Language Model (LLM) trained to recognize patterns in annotations; and generating a response to the user query using an output of the LLM.

16. The computer program product of claim 15, wherein a first document of the plurality of documents is an image document, and wherein the coordinate data identifies a location on the first document.

17. The computer program product of claim 16, wherein the coordinate data comprises x, y coordinates of the image document.

18. The computer program product of claim 15, wherein a first document of the plurality of documents is a text document, and wherein the coordinate data identifies a location in the text document.

19. The computer program product of claim 15, wherein the embedding is provided to the LLM based on being determined by a similarity search.

20. The computer program product of claim 19, wherein the similarity search determines similarities between the user query and a plurality of embeddings stored in the vector store.

* * * * *